United States Patent [19]

Angelo et al.

[11] 4,137,211

[45] Jan. 30, 1979

[54] WIRE COATING SOLUTION

[75] Inventors: Raymond W. Angelo; Edward J. Armstrong, both of Endwell; Robert Bock, Binghamton, all of N.Y.

[73] Assignee: International Business Machines Corporation, Armonk, N.Y.

[21] Appl. No.: 800,106

[22] Filed: May 24, 1977

[51] Int. Cl.$^2$ ............ C08K 5/01; C08L 63/02; C08L 63/00

[52] U.S. Cl. ............ 260/31.4 EP; 260/31.2 N; 260/33.4 EP; 260/836

[58] Field of Search ............ 260/31.2 N, 31.4 EP, 260/33.4 EP, 2 EC, 2 EB, 836

[56] References Cited

U.S. PATENT DOCUMENTS

| | | | |
|---|---|---|---|
| 3,230,111 | 1/1966 | Hall et al. | 427/120 |
| 3,379,791 | 4/1968 | Larson et al. | 260/33.4 EP |
| 3,410,926 | 11/1968 | Hicks | 260/33.4 EP |
| 3,518,217 | 6/1970 | Irwin et al. | 260/33.4 EP |
| 3,650,997 | 3/1972 | Weisfeld et al. | 260/33.4 EP |
| 3,668,302 | 6/1972 | Boland et al. | 252/8.1 |
| 3,732,168 | 5/1973 | Ottmann et al. | 252/63.7 |
| 3,960,799 | 6/1976 | Mosimann | 260/33.4 EP |

*Primary Examiner*—Herbert J. Lilling
*Attorney, Agent, or Firm*—Pollock, Vande Sande & Priddy

[57] ABSTRACT

A solderable, flame retardant wire coating solution composition comprising a bromine and phosphorous containing polyol and hydroxy terminated saturated polyester of adipic acid and ethylene glycol together with a suitable epoxy resin and a phenol blocked toluene diisocyanate adduct. To this is added a small weight/percent of a catalyst, such as dibutyltin dilaurate, all mixed in a suitable solvent.

9 Claims, No Drawings

WIRE COATING SOLUTION

BACKGROUND OF THE INVENTION

1. Field of the Invention

This invention relates generally to wire coatings and more particularly to a solderable, flame retardant wire coating composition adapted for use in solder bonding.

2. Prior Art

There has been a significant increase in the need for automated wiring, such as overflow wiring and back wiring for printed circuit board panels and the like. Since the wire for such application is drawn from a continuous reel or roll of wire, there has been an increasing requirement that in addition to being flame retardant, the wire must also be solderable or bondable since the automated wiring generally requires that the wire not be physically stripped at the point of connection. In addition to being both solderable and flame retardant, the wire must continue to have the necessary physical characteristics, such as: the ability to undergo twisting; have stable temperature and humidity characteristics; have a prescribed dielectric constant; have acceptable chemical resistances and abrasion resistances; and be available at a reasonable cost.

In the context of the present invention, solderability connotes a coating which will both volatilize and/or retract, leaving a solerable wire material and no harmful residues which might contaminate or adversely affect a solder joint. The concept of being flame retardant implies a wire coating which upon being ignited will extinguish itself in a very short period of time and over a very minimal distance.

The coating materials that are generally available have one of the two desired characteristics, but usually not both because they are somewhat diametrically opposed in terms of constituents and characteristics. For example, a coating which is highly flame retardant, usually does not readily and quickly melt to provide the desired bondability or solderability. Conversely, a coating which does provide a desired solderability, is usually not very flame retardant and, in fact, may be flammable.

One considered approach was just to add a flame retardant to a commercially available wire coating formulation. While this approach appears to be deceptively simple, it has been found that the desired objectives cannot be reliably obtained. The resulting formulation may exhibit compatibility and stability problems. This is generally believed to be caused by the fact that the additives are relatively small molecules which can detract from the physical properties of the coating. The possibility of plasticizer or small molecule volatilization and migration from coatings to circuit lines and components can lead to varied, unpredictable and hard to diagnose failures.

The concept of using a solderable material suggests the use of a urethane or polyurethane which has many of the desired characteristics for the defined solderability requirements. However, the urethanes and polyurethanes are quite flammable and thus do not provide the desired characteristics of being flame retardant. As an example, U.S. Pat. No. 3,230,111 describes a coating using a combination of a titanium ester and an amino aldehyde resin to improve the solvent resistance of a polyurethane wire coating; however, there is no mention made of the flame retardancy of such a coating, nor is there any reason to believe that such a coating would be flame retardant.

U.S. Pat. No. 3,732,168 discloses a solderable polyurethane where solderability is defined by dipping the coating in a hot solder bath and melting the coating from the wire. Again, there is no mention made of the flame retardancy, nor is there any reason to believe that such a coating would be flame retardant.

U.S. Pat. No. 3,668,302 describes a flame retardant wire coating which consists of a brominated phosphate ester added to a cellulose acetate solution. This is basically a textile covered wire which is a much thicker covering on a wire than is contemplated for wires such as are used on back bonding of printed circuit boards and the like. Also, this patent does not make any mention of the solderability of the coating and there is every reason to believe that such a coating is not solderable within the definition.

A coating similar to that of the present invention is described on page 420 of the IBM Technical Disclosure Bulletin, Volume 19, No. 2, dated July 1976 in the article entilted "Solderable, Flame-Retardant Wire Coating" by R. W. Angelo, E. J. Armstrong and R. Bock.

OBJECTS AND SUMMARY OF THE INVENTION

Accordingly, it is a principal object of the present invention to provide a solderable, flame retardant wire coating solution which overcomes the foregoing disadvantages of the prior art.

A further object of the invention is to provide a solderable, flame retardant wire coating solution which is readily machine processable.

Yet another object of the present invention is to provide a solderable, flame retardant wire coating solution which, when coated, has the ability to undergo twisting, has stable temperature and humidity characteristics and has a prescribed dielectric constant.

A still further object of the invention is to provide a solderable, flame retardant wire coating solution which has acceptable chemical resistance and abrasion resistance and is available at a reasonable cost.

The foregoing and other objects are accomplished according to one aspect of the invention wherein a wire coating solution comprises a hydroxy terminated saturated polyester mixed with a bromine and phosphorous containing polyol in a reaction kettle in a suitable heating mantle. A solvent mixture is then added and heating and stirring are begun, following which an epoxy resin and a phenol blocked toluene diisocyanate adduct are added with the heating and stirring continued until all of the material is dissolved. Next, a catalyst, such as a dibutyltin dilaurate, is dissolved in a small quantity of the mixture and the resultant is added to body of the remainder of the mixture yielding a wire coating varnish formulation which is readily processable and is flame retardant as well as solderable.

DESCRIPTION OF THE PREFERRED EMBODIMENTS

The foregoing and other objects of the present invention are provided by a specific interactive formulation using as basic constituents a bromine and/or phosphorous containing polyol, a hydroxy terminated saturated polyester, a solid condensation product of bisphenol-A and epichlorhydrin, a phenol blocked toluene diisocyanate and a catalyst, all of which are suitably carried by a solvent. In a preferred embodiment, the hydroxy terminated saturated polyester and the polyol are placed in a reaction kettle in a suitable heating mantle. The solvent mixture is then added, and heating and stirring are begun. Thereafter the epoxy resin and the phenol blocked toluene diisocyanate are added and the heating and stirring are continued until all of the material is dissolved. Next, the catalyst is dissolved in a small quantity of the prepared material and added to the remainder, yielding the wire coating varnish formulation which has the desired properties. In the basic configuration, the solids of the material constitute about 35% by weight of the final mixture and the solvent constitutes about 65% by weight of the final mixture.

An example of a specific polyol containing bromine and phosphorous is one having a molecular weight of 3000. Examples of some solid epoxies of bisphenol-A and epichlorohydrin are those with an epoxy equivalent of 1650 to 2050. An example of the polyester constituent is one with an average equivalent weight of 195.

In the particular formulation, the solids are combined within the following percentages by weight:

| | |
|---|---|
| Bromine and phosphorus containing polyol | 31 – 35% |
| Hydroxy terminated saturated polyester | 9 – 12% |
| Solid condensation product of bisphenol-A and epichlorohydrin epoxy | 14 – 21% |
| Phenol blocked toluene diisocyanate | 35 – 43% |
| Catalyst | 0.1 – 1.0% |

The solvent which yields the desired viscosity and coatability to the final formulation can be constitued of approximately 40% of a cresylic acid and 60% of xylene plus higher aromatics. Typical of the latter is the product marketed under the tradename Aromatic 100 by the Exxon Company.

Another solvent mixture which can be combined with the above-described solids consists of approximately 33% butyl acetate, 34% of ethylene glycol monoethyl ether acetate, 17% toluene and 16% xylene.

Typical catalysts that can be used for the formulation include the octoates of zinc, lead and cobalt, the naphthenates of cobalt, zinc, manganese, and calcium, the tallates of lead manganese or cobalt and the acetylacetonates of cobalt, nickel, zinc, maganese, mercury, copper, chromium or ferric. These catalysts are generally classified as organometallics and could further include various dibutyltin compounds such as the oxide, diacetate, dilaurate, di-2-ethyl hexoate or maleate.

In addition to the other desired characteristics, the catalysts are found to accelerate the drying time and to improve the overall curing mechanism for the resultant wire coating. With the formulations based upon the above, it is then possible to generate a relatively high oxygen index for the wire coating, while still providing a product which is machine processable. Specific examples of particular formulations which yield the desirable solderability, flame retardancy and machine processability are as follows:

EXAMPLE I

A mixture of 31% by weight of a bromine and phosphorous containing polyol, 12% by weight of a hydroxy terminated and saturated polyester, 14% of a solid condensation product of bisphenol-A and epichlorohydrin epoxy, and a 43% by weight phenol blocked toluene diisocyanate to which was added about 0.2% of the catalyst dibutyltin dilaurate. The solids were carried in a solvent consisting of approximately 40% cresylic acid and 60% of xylene and the higher aromatics, such as the solvent manufactured by Esso Standard Oil Company under the tradename "Solvesso".

This coating was applied to the wire using a dieless applicator, the bare wire being preheated just prior to its entrance into the enameling application. The viscosity of the enamel bath was maintained at 60 to 65 centipoises (substantial variations above or below this result in a radical diameter change) and the oven temperature was maintained at 550° F. The enameling bath temperature was held at 105° F.

The thickness of the coating on the wire was dependent upon the number of wire passes through the machine. For a 1.5 mil wall, approximately 18 passes were required and could include one or more dry passes to reduce surface softness and tackiness. The enamel coating was applied using an applicator speed of 70 revolutions per minute and a wire speed of 30 feet per minute. With this wire coating mixture and process, it was found that a desirably concentric, highly reliable, solderable, flame retardant coating was accomplishing having an oxygen index of about 24.5.

EXAMPLE II

The solid mixture consisted of approximately 35% by weight of a bromine and phosphorous containing polyol, approximately 9% of a hydroxy terminated saturated polyester of adipic acid and ethylene glycol, 21% by weight of a solid condensation product of bisphenol-A and epichlorohydrin epoxy, and 35% of a phenol blocked toluene diisocyanate adduct. To this was added a catalyst consisting of approximately 25 parts of zinc octoate in combination with one part of lead octoate, the total making up about one percent of the total solids by weight.

The above solid mixture was combined with a solvent consisting of about 40% of cresylic acid and 60% Solvesso. The resultant mixture was used to enamel coat wires in approximately the same manner as that used in Example I above. This resulted in an oxygen index of between 24 and 25, in addition to providing the other desirable characteristics of the flame retardant, solderable wire coating.

It is therefore readily apparent that applicants have provided an improved wire coating having both solderability characteristics and flame retardant characteristics, capable of coating a wire with a uniform diameter in a machine processable system. It will be apparent to those skilled in the art that various modifications and variations can be made in the coating as described above without departing from the spirit or scope of the invention. Accordingly, it is not intended that the present invention be limited to the specifics of the foregoing descriptions of the preferred embodiments, but rather as to embrace the full scope of the following claims.

We claim:

1. A solderable, flame retardant wire coating solution consisting of about 30–40% by weight of solids in about 70–60% by weight of solvent wherein said solids comprise by weight:
   from 31 to 35% of a polyol containing bromine and phosphorous;
   from 9 to 12% of a hydroxy terminated saturated polyester of adipic acid and ethylene glycol;
   from 14 to 21% of a solid epoxy condensation product of bisphenol A and epichlorohydrin wherein said condensation product has an epoxy equivalent of 1650–2050;

from 35 to 43% of phenol blocked toluene diisocyanate adduct; and a catalyst between 0.1 and 1.0% of the solids.

2. The invention according to claim 1 wherein said solvent comprises about 40% of cresylic acid and about 60% of xylene and the higher aromatics.

3. The coating solution of claim 1 wherein said polyol has a molecular weight of 3000.

4. The invention according to claim 1 wherein said solvent comprises about 33% butyl acetate, about 34% ethylene glycol monoethyl ether acetate, about 17% toluene and about 16% xylene.

5. The invention according to claim 1 wherein said catalyst is chosen from the group consisting of the octoates of zinc, lead and cobalt.

6. The invention according to claim 1 wherein the catalyst is chosen from the group consisting of the naphthenates of cobalt, zinc, manganese and calcium.

7. The invention according to claim 1 wherein the catalyst is chosen from the group consisting of the tallates of lead, manganese and cobalt.

8. The invention according to claim 1 wherein the catalyst is chosen from the group consisting of the acetylacetonates of cobalt, nickel, zinc, manganese, mercury, copper, chromium and ferric.

9. The invention according to claim 1 wherein the catalyst is chosen from the group consisting of dibutyltin oxide, tetrabutyltin, tetraphenyltin, dibutyltin diacetate, dibutyltin dilaurate, dibutyltin di-2-ethyl hexoate and dibutyltin maleate.

* * * * *

UNITED STATES PATENT AND TRADEMARK OFFICE
CERTIFICATE OF CORRECTION

PATENT NO. : 4,137,211

DATED : January 30, 1979

INVENTOR(S) : Raymond W. Angelo; Edward J. Armstrong and Robert Bock

It is certified that error appears in the above-identified patent and that said Letters Patent are hereby corrected as shown below:

Column 3, line 32, change "constitued" to --constituted--.

Column 3, line 41, change "for" to --with--.

Signed and Sealed this

Eleventh Day of September 1979

[SEAL]

Attest:

Attesting Officer

LUTRELLE F. PARKER

Acting Commissioner of Patents and Trademarks